United States Patent [19]

Homan

[11] Patent Number: 4,743,474
[45] Date of Patent: May 10, 1988

[54] COATING PROCESS AND MOISTURE-CURABLE ORGANOPOLYSILOXANE COMPOSITIONS THEREFOR

[75] Inventor: Gary R. Homan, Midland, Mich.

[73] Assignee: Dow Corning Corporation, Midland, Mich.

[21] Appl. No.: 605,315

[22] Filed: Apr. 30, 1984

Related U.S. Application Data

[63] Continuation-in-part of Ser. No. 520,793, Aug. 5, 1983, abandoned.

[51] Int. Cl.$^4$ .................................................. B05D 3/02
[52] U.S. Cl. .................................... 427/387; 428/447; 528/17; 528/19; 528/33; 528/34; 528/35; 528/901
[58] Field of Search .................... 528/17, 19, 35, 33, 528/34, 901; 427/387; 428/447

[56] References Cited

U.S. PATENT DOCUMENTS

| | | | |
|---|---|---|---|
| 3,122,522 | 2/1964 | Brown et al. | 260/46.5 |
| 3,175,993 | 3/1965 | Weyenberg | 260/46.5 |
| 3,509,081 | 4/1970 | Gignac, Jr. | 260/18 |
| 4,269,963 | 5/1981 | Homan et al. | 528/17 |

FOREIGN PATENT DOCUMENTS

A0123935 7/1984 European Pat. Off. .

*Primary Examiner*—Melvyn I. Marquis
*Attorney, Agent, or Firm*—George A. Grindahl

[57] ABSTRACT

Novel organopolysiloxane compositions, which cure rapidly from the liquid to the non-liquid state when exposed to moisture, are used to rapidly coat a substrate, such as label release liner, with an adhesive-releasing coating. Curing of the liquid coating occurs in 5 seconds at room temperature in some cases. The organopolysiloxane compositions contain a large amount of a metal ester, such as tetraisopropyl titanate, dissolved in an organopolysiloxane fluid which has moisture-reactive, silicon-bonded alkoxysilylorganic radicals.

22 Claims, No Drawings

COATING PROCESS AND MOISTURE-CURABLE ORGANOPOLYSILOXANE COMPOSITIONS THEREFOR

BACKGROUND OF THE INVENTION

This application is a continuation-in-part of U.S. Ser. No. 520,793, filed on Aug. 5, 1983, now abandoned.

The present invention relates to a process for coating a substrate with an organopolysiloxane composition, to moisture curable organopolysiloxane compositions which are used in said process and to organopolysiloxanes which are used in said compositions.

In particular the present invention relates to a process for rapidly providing a cured, adhesive-releasing organopolysiloxane coating on a flexible sheet substrate at room temperature, to rapidly curable organopolysiloxane compositions therefor and to organopolysiloxane fluids that are particularly suited therefor.

Rapidly curable coating compositions are required in fast-paced coating operations, such as paper or fiber coating operations, wherein, in rapid succession, a curable composition is applied to a substrate, the applied composition is cured and the coated substrate is subjected to further operations such as packaging, spooling, rolling, cutting or further coating.

Organopolysiloxane coating compositions which are rapidly curable are known; however, they require the use of added energy, such as heat or radiation, to achieve rapid curing. Since the use of added energy is frequently precluded when the substrate to be coated is easily damaged, and with all coating operations represents an added cost, there exists a definite need for an organopolysiloxane coating composition which will cure rapidly on a substrate without the use of added energy.

Moisture curable organopolysiloxane compositions cure without the use of added energy; however, moisture curable compositions of the art are not regarded as being rapidly curable. The most common examples of these moisture curable organopolysiloxane compositions are the acid, alcohol, amide or oxime releasing compositions which find use as encapsulants, sealants and caulks. These common compositions comprise an organopolysiloxane component which bears hydrolyzable radicals which are bonded to siloxane silicon atoms, i.e. silicon atoms which are bonded to other silicon atoms through a siloxane linkage. They are not, however, rapidly curable since they take several minutes to become tack-free and hours to become fully cured.

Of more relevance to the present invention are the moisture curable compositions of Weyenberg, U.S. Pat. No. 3,175,993; Brown et al., U.S. Pat. No. 3,122,522 and Homan et al., U.S. Pat. No. 4,269,963.

The compositions of Weyenberg consist essentially of a siloxane component which contains two to three alkoxy or haloalkoxy radicals bonded to each of two, three or four terminal silcarbane silicon atoms, i.e. terminal silicon atoms which are bonded to other silicon atoms through divalent hydrocarbon radicals instead of the usual divalent oxygen atoms, and optionally a catalyst component for accelerating the cure of the siloxane component in the presence of moisture.

The curing rate of the compositions of Weyenberg is said to be variable by the choice of said catalyst and the functional groups present in the system. A portion of this teaching is supported by Weyenberg's examples which show that as the catalyst is varied from stannous octoate to tetraisopropyl titanate to tetrakis(methylcellosolve) titanate the tack-free cure time of the composition ranges from 40 minutes to less than 24 hours to 48 hours, respectively. Weyenberg further states that the amount of catalyst is not critical but is normally present in an amount of from 0.1 to 2 percent by weight, based on the weight of siloxane.

The suggested uses for the compositions of Weyenberg are as coating compositions, sealants, impregnating compounds and for electrical insulation. It can be seen from the disclosure of Weyenberg that neither rapidly curing compositions nor rapid coating processes are contemplated therein.

The compositions of Brown et al. consist essentially of a siloxane component which contains two or three cellosolvoxy radicals bonded to at least two terminal silcarbane silicon atoms, i.e. terminal silicon atoms which are bonded like those described in Weyenberg's disclosure above, and optionally a catalyst component for accelerating the cure of the siloxane component in the presence of moisture.

When the catalyzed compositions of Brown et al. are exposed to moisture, their viscosities are said to gradually increase and cure follows thereafter. The catalyst component is preferably present in an amount that ranges from 0.1 to 5 parts by weight per 100 parts of siloxane to provide maximum catalyst efficiency. However, rapid cure rate of the catalyzed compositions of Brown et al. is not contemplated therein.

The compositions of Homan et al. comprise a siloxane component which contains at least two sulfur-containing siloxane units and no more than 10 mol percent pendant sulfur-containing siloxane units per molecule, and optionally a curing catalyst to accelerate the cure of the siloxane component in the presence of moisture. The sulfur-containing siloxane units contain two or three methoxy or ethoxy radicals bonded to a silicon atom which is bonded to another silicon atom by an oxygen-free, sulfur-containing, divalent thioether radical.

The catalyzed compositions of Homan et al. are said to spontaneously and rapidly cure when exposed to moisture; however, specific cure times recited by Homan et al. range from 5 to 45 minutes. Rapid curing of Homan's compositions is thus not apparent.

It is thus apparent that, while the art discloses compositions that cure rapidly and compositions that cure without the use of added energy, it does not disclose organosiloxane compositions that cure rapidly without the use of added energy.

BRIEF SUMMARY OF THE INVENTION

It is an object of the present invention to provide a process, a composition useful therein and an organopolysiloxane fluid therefor for rapidly coating a substrate with a cured organopolysiloxane coating. It is a particular object of this invention to provide a process, a composition useful therein and an organopolysiloxane fluid therefor for rapidly coating at least one surface of a flexible sheet substrate with a cured, adhesive-releasing organopolysiloxane coating. It is also an object of this invention to provide a process, a composition useful therein and an organopolysiloxane fluid therefor for rapidly coating a substrate with a cured organopolysiloxane coating that does not require added energy to achieve rapid curing of the organopolysiloxane coating.

These objects, and others which will become apparent to those skilled in the organopolysiloxane coating art upon consideration of the following disclosure and appended claims, are obtained by the present invention which, briefly stated, comprises applying a thin coating of the moisture curing compositions of this invention to a substrate and suitably exposing the applied composition to moisture. The compositions of this invention are prepared by mixing components comprising certain alkoxy-substituted organopolysiloxane fluids and a sufficient amount of a soluble, metal ester to provide a tack-free cure time of less than two minutes for the coating composition. The alkoxy-substituted organopolysiloxane fluid and the metal ester can each be either a known material or a novel material disclosed herein.

Properly formulated compositions of this invention have the unexpected advantage of curing so rapidly when applied to paper that they experience little or no soak-in, even on highly porous paper. This characteristic allows the compositions of this invention to be used on less expensive grades of paper and/or at reduced coverage rates, compared to the slower curing compositions of the art, to obtain effective adhesive release therefrom.

While not wishing to be limited by theory I believe that when an amount of a metal ester is used in the compositions of this invention which is greater than the catalytic levels taught in the art the resultant rapid curing of the composition in the presence of moisture is due in large part to rapid formation of numerous metal—O—Si bonds, in addition to the usual metal-catalyzed formation of Si—O—Si bonds.

DETAILED DESCRIPTION OF THE INVENTION

More specifically, the present invention relates, in a first aspect, to a liquid composition which cures to a non-liquid composition when exposed to moisture, said liquid composition being prepared by mixing, under substantially anhydrous conditions, component comprising (A) an organopolysiloxane fluid comprising at least two silicon-bonded, alkoxysilylorganic radicals having the formula —$QSiR_a^1(OR^2)_{3-a}$, wherein Q denotes a divalent organic radical bonded to silicon atoms by silicon-carbon bonds, $R^1$ denotes a monovalent hydrocarbon or substituted hydrocarbon radical having from 1 to 6 carbon atoms, $R^2$ denotes a methyl, ethyl, propyl or methoxyethyl radical and a has a value of 0 or 1, and (B) a metal ester, soluble in said liquid composition selected from the group consisting of titanium esters, zirconium esters, hafnium esters and vanadium oxide esters; the amounts of components (A) and (B) being sufficient to provide a track-free cure time of less than 120 seconds for the liquid composition.

In its broadest form this aspect of the present invention relates to a liquid composition which has a tack-free cure time of less than 120 seconds, as measured by the Tack-Free Cure Tume test method described below, and contains at leas an alkoxy-substituted organopolysiloxane fluid, further described below, and a metal ester dissolved in the organopolysiloxane fluid. When the organopolysiloxane fluid contains at least two, and preferably more, silicon-bonded alkoxysilylorganic radicals having the formula —$QSiR_a^1(OR^2)_{3-a}$ a composition having a tack-free time of less than 120 seconds can be prepared by dissolving a sufficient amount of a metal ester in the organopolysiloxane fluid. Said sufficient amount of metal ester depends on the particular metal ester and the particular organopolysiloxane fluid that is used, as detailed below.

The compositions of this invention are liquid compositions. That is to say, the compositions of this invention can be applied to a substrate by flowing, spreading, extruding, rolling, brushing and the like. When the compositions of this invention are exposed to moisture they cure to the non-liquid state.

Component (A) of the compositions of this invention can be any organopolysiloxane fluid which contains at least two alkoxysilylorganic radicals having the formula —$QSiR_a^1(OR^2)_{3-a}$. The alkoxysilylorganic radicals can be bonded to terminal siloxane units and/or to non-terminal siloxane units of the organopolysiloxane, which can have a molecular structure which is branched, linear and/or cyclic.

In the alkoxysilylorganic radical shown above Q denotes a divalent organic radical which is bonded to silicon atoms by silicon-carbon bonds. The specific structure of Q is not critical as long as it does not adversely effect the utility of the compositions of this invention as a rapidly curing coating composition, and particularly as an adhesive-releasing, paper-coating composition.

Typically the particular Q radical is further selected on the basis of organopolysiloxane synthesis methods and starting materials therefor, further delineated below. For example, Q can be an alkylene radical such as —$C_2H_4$— or —$C_3H_6$— which arises from readily available vinyl- or allyl-substituted silanes or siloxanes. Q can be, for example, an ester-containing radical such as —$CH_2CH(CH_3)CO_2CH_2CH_2CH_2$—which arises from readily available methacryloxypropyl-substituted silanes. As another example Q can be a urethane-containing radical such as —$CH_2CH_2CH_2(OCH_2CH_2)_7O_2CNHCH_2CH_2CH_2$— which arises from readily available alcohol-substituted siloxanes and isocyanatoalkyl-substituted silanes. Based on the above delineation other suitable Q radicals will occur to the reader of ordinary skill in the organopolysiloxane coatings art and are within the scope of the present claims.

To obtain maximum ease of adhesive-release from the cured compositions of this invention Q preferably contains only carbon and hydrogen atoms and most preferably is an alkylene of the formula —$C_nH_{2n}$—having from 2 to 10 carbon atoms, such as —$CH_2CH_2$—.

In the alkoxysilylorganic radical show above, and in the organopolysiloxanes disclosed herein, $R^1$ denotes any monovalent hydrocarbon or substituted hydrocarbon radical having from 1 to 6, both inclusive, carbon atoms. Examples of $R^1$ radicals include alkyl radicals, such as methyl, ethyl, propyl, butyl, pentyl and hexyl; cycloaliphatic radicals, such as cyclohexyl; aliphatically unsaturated radicals, such as vinyl, allyl, butenyl and cyclohexenyl; and aryl radicals, such as phenyl. $R^1$, at each occurrence is preferably the methyl radical in view of its favorable adhesive-releasing characteristics, ready availability and ease of preparation.

In the alkoxysilylorganic radical each $R^2$ denotes a radical selected from the group consisting of methyl, ethyl, propyl and methoxyethyl radicals. For rapid curing of the compositions of this invention on a paper substrate, as measured by the smear, migration, rub-off test delineated below it is preferred that each $R^2$ be a methyl radical. For maximum cure rate for any particular composition of this invention the alkoxysilylorganic radicals are preferably trialkoxysilylorgano radicals ($-QSi(OR^2)_3$), such as $-QSi(OMe)_3$ radicals; however, $-QSiMe(OMe)_2$ radicals also provide highly desirable cure rates.

As noted above, component (A) can have any suitable siloxane structure as long as it is a fluid and contains at least two alkoxysilylorganic radicals. Preferably said siloxane structure consists of two or more siloxane units selected from terminal siloxane units of the formulae $RR_2^1SiO_{\frac{1}{2}}$ and $R_3^1SiO_{\frac{1}{2}}$ and non-terminal siloxane units of the formulae $RR^1SiO_{2/2}$, $R_2^1SiO_{2/2}$, $RSiO_{3/2}$, $R^1SiO_{3/2}$ and $SiO_{4/2}$ wherein R denotes the above-delineated alkoxysilylorganic radical and $R^1$ is as denoted above. It should be stated that, if desired, a minor portion of the $R^1$ radicals in the above-listed siloxane units can be replaced with $R^1$ radicals which have been substituted with substituents that are unreactive with the metal ester, such as halogen atoms, such as fluorine and chlorine; or organic groups, such as cyano, amido and carbalkoxy.

Examples of siloxane units having the above formulae include terminal units such as $Me_3SiO_{\frac{1}{2}}$, $PhMeViSiO_{\frac{1}{2}}$, $Me_2ViSiO_{\frac{1}{2}}$, $Me_2EtSiO_{\frac{1}{2}}$, $H_2NCOCH_2CH_2Me_2SiO_{\frac{1}{2}}$, $NCCH_2CH_2Me_2SiO_{\frac{1}{2}}$, $MeO_2CCH_2CH_2Me_2SiO_{\frac{1}{2}}$, $ClCH_2CH_2CH_2Me_2SiO_{\frac{1}{2}}$, $F_3CCH_2CH_2Me_2SiO_{\frac{1}{2}}$, $RMe_2SiO_{\frac{1}{2}}$ and $RPhMeSiO_{\frac{1}{2}}$; and non-terminal units such as $Me_2SiO_{2/2}$, $PhMeSiO_{2/2}$, $MeViSiO_{2/2}$, $NCCH_2CH_2MeSiO_{2/2}$, $MeO_2CCH_2CH_2MeSiO_{2/2}$, $CH_3CONHCH_2CH_2CH_2MeSiO_{2/2}$, $F_3CCH_2CH_2MeSiO_{2/2}$, $ClCH_2CH_2MeSiO_{2/2}$, $RMeSiO_{2/2}$, $RPhSiO_{2/2}$, $RSiO_{3/2}$, $MeSiO_{3/2}$, $PhSiO_{3/2}$, $MeO_2CCH_2CH_2SiO_{3/2}$, $ViSiO_{3/2}$, $EtSiO_{3/2}$, $NCCH_2CH_2SiO_{3/2}$, $F_3CCH_2CH_2SiO_{3/2}$ and $ClCH_2CH_2CH_2SiO_{3/2}$, wherein Me, Et, Vi and Ph denote the methyl, ethyl, vinyl and phenyl radicals, respectively.

Most preferably component (A) of the compositions of this invention has a linear siloxane structure having the formula (Ia).

$$ZR_2^1SiO(Me_2SiO)_x(RR^1SiO)_y(R_2^1SiO)_zSiR_2^1Z \qquad (Ia)$$

In formula (Ia) Me denotes a methyl radical, Z denotes either an R radical or an $R^1$ radical, and R and $R^1$ have the meanings delineated above, including preferred delineations thereof.

In formula (Ia) x has a value of at least about 50 and z has a value of from 0 to not more than x when the $R^1$ radicals of the $R_2^1SiO$ siloxane units are not methyl. Of course when $R_2^1SiO$ is $Me_2SiO$ the value of z is included in the value of x. The lower limit of 50 dimethylsiloxane units is established in order to provide preferred adhesive release for the coating compositions of this invention; the upper limit for the value of z is established for the same reason. The value of x in formula (Ia) is preferably from 50 to 500, and most preferably from 100 to 400, and the value of z is selected to modify the physical properties of a cured composition of this invention as desired when $R_2^1SiO$ is not $Me_2SiO$.

The value of y in formula (Ia) can be from 0 (in which case each Z must be an R radical) to $(x+y+z)/4$ (in which case each Z may be an R radical or an $R^1$ radical). The maximum value of y should not exceed the value of $(x+y+z)/4$, that is, 25 mol percent of the total number of internal siloxane units in the organopolysiloxane, in order to provide a catalyzed composition that has a resistance to gelling in storage. For organopolysiloxanes wherein the value of $x+y+z$ exceeds about 120 the value of y need not exceed the value of $3600/(x+y+z)$ in order to provide ideally rapid cure rates for the catalyzed compositions of this invention.

Thus as the value of $x+y+z$ is increased from 50 to $66\frac{2}{3}$ to 120 and higher, and the value of x is at least 50, the maximum permissable value of y ranges from 0 to $16\frac{2}{3}$ to 30 and higher, respectively; however, the maximum ideal value of y ranges from 0 to $16\frac{2}{3}$ to 30 and then to progressively lower values, respectively. Ideally then, the organopolysiloxanes of this invention have no more than about 30 R radicals per molecule.

As noted above, $R^1$ and $R^2$ are preferably methyl radicals, thereby giving rise to organopolysiloxanes having the formula (Ib) as a highly preferred component (A) of the compositions of this invention.

$$ZMe_2SiO(Me_2SiO)_x(MeRSiO)_ySiMe_2Z \qquad (Ib)$$

In addition each R radical in (Ib) is preferably $-Q-SiMe_a(OMe)_{3-a}$ for the reasons noted above. The value of $x+y$ in formula (Ib) is preferably from about 100 to about 400 and the value of y is preferably from 0 to about $3600/(x+y)$ when the value of $x+y$ is 120 or greater and from 0 to about $(x+y)/4$ when the value of $x+y$ is less than 120. That is to say, as the value of $x+y$ in formula (Ib) increases beyond 120 the preferred number of alkoxysilylorganic radicals that are present in component (A) decreases. There is therefore an opportunity to select an organopolysiloxane of formula (Ib) which represents a compromise between desirably low alkoxysilylorganic radical content and desirably low molecular weight.

Preferred examples of component (A) which have the formula (Ib) are obtained when Q is an alkylene radical of the formula $-C_nH_{2n}-$ wherein n has a value of from 2 to about 10. Structures having the formula (Ib) and being further illustrated by the examples disclosed below include $$Me_3SiO(Me_2SiO)_x(MeSiO)_ySiMe_3 \atop | \atop C_nH_{2n}Si(OMe)_3 \qquad (Ic)$$

$$(MeO)_3SiC_nH_{2n}(Me)_2SiO(Me_2SiO)_xSi(Me)_2C_nH_{2n}Si(OMe)_3 \qquad (Id)$$

and $$(MeO)_3SiC_nH_{2n}(Me)_2SiO(Me_2SiO)_x(MeSiO)_ySi(Me)_2C_nH_{2n}Si(OMe)_3 \atop | \atop C_nH_{2n}Si(OMe)_3 \qquad (Ie)$$

wherein x and y are as noted above and may have such values as 100 and 5, 250 and 4, 400 and 3, 250 and 14, 100 and 7 and 400 and 9, respectively.

Examples of known organopolysiloxane fluids which are useful as component (A) in the compositions of this invention include those disclosed by Brown et al., U.S. Pat. No. 3,122,522; Weyenberg, U.S. Pat. No. 3,175,993; Gignac, Jr., U.S. Pat. No. 3,509,081; and Homan et al., U.S. Pat. No. 4,269,963 the disclosures of which are incorporated herein by reference to show suitable examples of component (A) of the compositions of this invention.

Examples of novel organopolysiloxane fluids which are useful as component (A) in the compositions of this invention include the organopolysiloxane fluids of this invention which comprise a second aspect of the present invention and which have the formula (IIa).

$$Z^1R_2^1SiO(Me_2SiO)_x(DR^1SiO)_y(R_2^1SiO)_zSiR_2^1Z^1 \qquad (IIa)$$

The organopolysiloxanes of this invention (IIa) are a subset of the organopolysiloxanes described by formula (Ia) above in that Me, $R^1$, $R^2$, x, z and a have the same meaning in each case, including preferred embodiments thereof, while the alkoxysilylorganic radicals (D) and $Z^1$ radicals that are present in the organopolysiloxanes of this invention are encompassed by the alkoxysilylorganic radicals (R) and Z radicals of formula (Ia) but are further restricted therefrom as to minimum number (value of y) and structure.

The alkoxysilylorganic radicals that are present in the organopolysiloxanes of this invention are denoted by D and have the formula $-Q^1SiR_a^1(OR^2)_{3-a}$ wherein $Q^1$ denotes a a 3-a divalent organic radical which is free of sulfur atoms. In all other respects the delineation of Q radicals noted above is hereby applied to the class of $Q^1$ radicals.

The number of alkoxysilylorganic radicals that are present in formula (IIa) has a value of at least three. Thus the organopolysiloxanes of this invention must contain at least one alkoxysilylorganic radical which is bonded to a non-terminal siloxane unit of the organopolysiloxane.

The organopolysiloxanes of this invention are particularly useful as component (A) in the compositions of this invention delineated above, although they are expected to also be useful as a base fluid for other moisture curing formulations, filled or unfilled.

In accordance with the first aspect of this invention a highly preferred class of organopolysiloxanes of this invention have the formula (IIb).

$$Z^1Me_2SiO(Me_2SiO)_x(MeDSiO)_ySiMe_2Z^1 \quad (IIb)$$

Furthermore, in formula (IIb) D denotes the preferred radical $-Q^1SiMe_a(OMe)_{3-a}$ for the reasons noted above for the preferred R radicals of organoplysiloxane (Ib), the value of x+y is preferably from about 100 to 400 and the value of y, while having a lower limit of 1, has the same upper limit as noted for organopolysiloxane (Ib). Organopolysiloxanes (Ic) and (Ie) are highly preferred organopolysiloxanes of this invention.

The particular advantages of using the organopolysiloxanes of this invention as a component (A) in the compositions of this invention, instead of the above-described organopolysiloxanes that are old in the art, are that they are easier to synthesize then the branched organopolysiloxanes of Weyenberg or Brown et al., they are more reactive than the linear organopolysiloxanes of Weyenberg or Brown et al. and they do not have the sulfur odor of the organopolysiloxanes of Homan et al.

It should be noted that although the formulae for the organopolysiloxanes disclosed above are written in groups of two or three types of internal siloxane units the conventional interpretation, i.e. random arrangement of internal siloxane units, of these formulae is intended.

It should also be noted that component (A), whether or not it is an organopolysiloxane of this invention, can contain trace amounts of silicon-bonded hydrogen atoms which remain unreacted after the preparation of said component without departing from the scope of this invention.

The organopolysiloxanes of this invention can be prepared by any suitable method, preferably giving rise to a random arrangement of internal siloxane units. Accordingly, a siloxane equilibration reaction is preferably used at some point in their preparations. As is well known, siloxane equilibration provides a minor amount of cyclic, as well as linear, organopolysiloxanes, even when terminal siloxane units are present in the equilibrating mixture. It is within the scope of the present invention to remove or not remove these cyclic organopolysiloxanes, as desired. Preferably the organopolysiloxanes of this invention do not contain more than about 15 percent by weight cyclic organopolysiloxanes that do not have alkoxysilylorganic radicals.

The organopolysiloxanes of this invention are preferably prepared by a process which comprises a hydrosilylation reaction between an organopolysiloxane reactant containing silicon-bonded hydrogen atoms or silicon-bonded aliphatically unsaturated radicals and a silane reactant containing 2 or 3 $-OR^2$ radicals, 1 or 0, respectively, $R^1$ radicals and 1 silicon-bonded aliphatically unsaturated radical or 1 silicon-bonded hydrogen atom, respectively. The hydrosilylation reaction thereby provides the organopolysiloxanes of this invention by creating the Q radical, delineated above, and bonding $-QSiR_a^1(OR^2)_{3-a}$ radicals to the organopolysiloxane through the Q radical.

For example an organopolysiloxane of this invention can be prepared by reacting, in the presence of a hydrosilylation catalyst, an organopolysiloxane reactant having the formula $$HR_2^1SiO(Me_2SiO)_x(HR^1SiO)_y(R_2^1SiO)_zSiR_2^1H,$$

optionally containing up to an equilibrium amount of cyclic organopolysiloxane containing any combination of $Me_2SiO$ siloxane units, $HR^1SiO$ siloxane units and $R_2^1SiO$ siloxane units, with a silane reactant having the formula $CH_2=CHCH_2SiR_a^1(OR^2)_{3-a}$, taken in sufficient amount to react with all available silicon-bonded hydrogen atoms in the organopolysiloxane reactant.

As another example, an organopolysiloxane of this invention can be prepared by reacting, in the presence of a hydrosilylation catalyst, an organopolysiloxane reactant having the formula $$R_3^1SiO(Me_2SiO)_x(R^1SiO)_y(R_2^1SiO)_zSiR_3^1,$$
$$| $$
$$CH=CH_2$$

optionally containing up to an equilibrium amount cyclic organopolysiloxane containing any combination of $Me_2SiO$ siloxane units, $$R^1SiO$$
$$|$$
$$CH=CH_2$$

siloxane units and $R_2^1SiO$ siloxane units, with a silane reactant having the formula $HSiR_a^1(OR^2)_{3-a}$, taken in sufficient amount to react with all available silicon-bonded vinyl radicals in the organopolysiloxane reactant.

In view of the disclose above and the examples below one skilled in the organosilicon art will be able to conceive other suitable methods for preparing the organopolysiloxanes of this invention.

Component (B) of the compositions of this invention is a metal ester which is soluble in the organopolysiloxane component (A) or mixtures thereof with other components such as solvents. By soluble it is meant herein that the amount of metal ester needed to provide the required amount of metal will dissolve in the liquid composition to provide a homogeneous, non-settling composition.

Metal esters are well known materials; many are widely used and are commercially available. For the pruposes of this invention titanium esters, such as tetraalkyl titanates, are preferred metal esters. Examples of tetraalkyl titanates include titanium esters of methanol, ethanol, n-propanol, i-propanol, n-butanol, s-butanol, i-butanol, t-butanol, 2-ethylhexanol and octadecanol. Of the tetraalkyl titanates tetraisopropyl titanate is the most preferred for the purposes of this invention.

If a longer tack-free time can be tolerated or if the compositions of this invention which are applied to a substrate can be heated to accelerate the cure rate thereof titanium esters other than tetraalkyl titanates can be used in the present invention. Thus aryl titanates and titanium chelates, which are expected to function in the same manner as tetraalkyl titanates in the present invention but in a slower manner, are also contemplated in the present invention. Examples of these additional titanium esters include triethanolamine titanate, octyleneglycol titanate and bis-acetylacetonyldiisopropyl titanate.

The titanium ester can by unhydrolyzed or partially hydrolyzed. Partially hydrolyzed titanium esters are those simple and complex compounds, and mixtures of compounds, that are obtained when a titanium ester, particularly a tetraalkyl titanate is exposed to water. Said exposure to water can be adventitious, such as that which occurs when a container of titanium ester is open repeatedly or extensively to a moisture-containing atmosphere; or it can be deliberate, such as that which occurs when liquid water, per se or in a carrier liquid, is added to the titanium ester in a less than stoichiometric amount.

The compositions of the present invention will cure when exposed to moisture, irrespective of whether a titanium ester or a partial hydrolyzate thereof, is present therein in the stated amount. However, the cure rate of any particular composition of this invention depends critically on the age of the composition if the composition has been prepared with an unhydrolyzed titanium ester and depends much less on the age of the composition if the composition has been prepared with a partial hydrolyzate of a titanium ester.

That is to say when a curable composition of this invention is prepared with unhydrolyzed tetraalkyl titanate, particularly tetraisopropyl titanate, the composition should be cured by exposure to moisture within about 15 minutes after components (A) and (B) are mixed, preferably within about 10 minutes and most preferably with about 5 minutes, such as immediately, after components (A) and (B) are mixed; if a rapid cure rate is desired. As noted above a rapid cure rate means that a tack-free composition is obtained within 120 seconds after its exposure to moisture.

Contrastingly, when a composition of this invention is prepared with a partial hydrolyzate of tetraisopropyl titanate the composition displays a rapid cure rate when exposed to moisture any time within a period of about one hour after components (A) and (B) have been mixed.

In addition to being a titanium ester or a partial hydrolyzate thereof component (B) of the compositions of this invention can be a partial alcoholate, such as a methanolate or ethanolate of tetraisopropyl titanate. Said partial alcoholate of tetraisopropyl titanate are new and can be prepared by adding less than four, and preferably about 2, molar parts of methanol and/or ethanol to one molar part of tetraisopropyl titanate. As with the partial hydrolyzates of titanium esters discussed above the use of partial alcoholates of tetraisopropyl titanate provide compositions of this invention which maintain their rapid cure rate for a longer period of time, e.g.up to two hours, than compositions prepared with unhydrolyzed tetraisopropyl titanate and are therefore preferred.

The amount of metal ester that is used in the compositions of this invention is merely that amount that will provide for the compositions a tack-free cure time of less than 120 seconds as defined below. Preferably a composition to be used in the method of this invention, detailed below, will provide a fully cured coating, as hereinafter defined, within less than 60 seconds, and preferably within less than 30 seconds, after being applied to a substrate and exposed to moisture.

When the compositions of this invention comprise an organopolysiloxane component (A) having the formula (Ia) the metal ester is preferably a titanium ester and should be used in an amount that will provide from 0.5 to 4.0 parts by weight of titanium per 100 parts by weight of the organopolysiloxane. More preferably a range of from 1.5 to 2.5 parts of titanium, on the same basis, is used. In terms of the preferred titanium ester, tetraisopropyl titanate, the amounts that will provide the stated amounts of titanium are about 3 to 24 parts, preferably about 9 to 15 parts. In terms of a novel and preferred partially methanolated tetraisopropyl titanate (80% TPT/20% MeOH on a weight basis) the corresponding amounts are about 3.7 to 29.7 parts, preferably about 11 to 18.5 parts.

Although not as desired as titanium esters, esters of zirconium, hafnium or vanadium oxide which are analogous to the above-described titanium esters can be used in place of titanates, if desired, in the compositions of this invention and suitable allowance can be made therefor with respect to amounts and curing temperatures.

The moisture curing compositions of this invention are prepared by thoroughly mixing components comprising the appropriate amounts of component (A) and component (B) under substantially anhydrous conditions. Preferably component (B) is added to component (A).

Any suitable mixing means can be used for said mixing. Preferably a mixing means that will permit the prompt use, such as the substantially immediate us, of the resulting mixture as a coating composition is used.

The moisture curing compositions of this invention can further comprise the usual optional components of moisture curable silicone compositions, such as fillers, colorants, stabilizers and diluents. Said optional components, if any, are preferably mixed with component (A) before component (B) is mixed therewith. When a diluent is used it may be desirable to mix said diluent with components (A) and/or (B) before (A) and (B) are mixed with each other.

The moisture curing compositions of this invention can further comprise silanes of the formula $SiR_b^1(OR^2)_{4-b}$, or partial hydrolyzates thereof, if desired, to modify the cured properties of the composition. In said formula $R^1$ and $R^2$ are as delineated above and b has a value of from zero to three, inclusive. Examples of suitable silanes include propyl orthosilicate, ethyl orthosilicate, ethyl polysilicate, methyltrimethoxy silane, cellosolve orthosilicate, dimethyldimethoxy silane and trimethylmethoxy silane.

The moisture curing compositions of this invention are useful as coating compositions, sealing compositions and encapsulating compositions. A preferred use for the compositions of this invention is as a coating composition as further delineated below.

In third aspect the present invention relates to a method comprising (i) applying to a substrate a liquid composition which cures to a non-liquid composition when exposed to moisture, said liquid composition being prepared by mixing, under substantially anhydrous conditions, components comprising (A) an organopolysiloxane fluid comprising at least two silicon-bonded, alkoxysilylorganic radicals having the formula —QSiR$_a^1$(OR$^2$)$_{3-a}$ wherein Q denotes a divalent organic radical bonded to silicon atoms by silicon-carbon bonds, R$^1$ denotes a monovalent hydrocarbon or substituted hydrocarbon radical having from 1 to 6 carbon atoms, R$^2$ denotes a methyl, ethyl, propyl or methoxyethyl radical and a has a value of 0 or 1, and (B) a metal ester, soluble in said liquid composition, selected from the group consisting of titanium esters, zirconium esters, hafnium esters and vanadium oxide esters; the amounts of components (A) and (B) being sufficient to provide a tack-free cure time of less than 120 seconds for the liquid composition and (ii) exposing the applied liquid composition to a moisture-containing environment until the applied composition has attained at least the desired amount of cure.

The moisture-curing compositions that are applied to a substrate in the method of this invention are those which are delineated above and claimed herein, including preferred embodiments thereof.

For example, the above-disclosed compositions of this invention which comprise an organopolysiloxane fluid having the formula (Ia) above and from 0.5 to 4.0 parts of titanium as a titanium ester are preferred for use in the method of this invention for providing a substrate with an elastomeric coating having various adhesive-releasing capabilities, depending, as noted above, upon the relative number and nature of R$^1$ radicals that are present therein. Furthermore, in order to enhance the possibility of the applied composition having a full cure time of less than 60 seconds at room temperature it is recommended that the titanium be present as tetraisopropyl titanate or a partial hydrolyzate, methanolate or ethanolate thereof.

As another example, the above-disclosed compositions of this invention which comprise an organopolysiloxane fluid having the formulae (Ib-e) above and from 1.5 to 2.5 parts of titanium as tetraisopropyl titanate or a partial hydrolyzate, methanolate or ethanolate thereof are preferred for use in the method of this invention for rapidly coating a paper substrate with an adhesive-releasing coating. By rapidly coating it is meant in this case that a period of less than 30 seconds is required to cure the applied composition to a no smear, no migration, no rub-off condition, as further described below.

As noted above, any liquid composition of this invention has a cure time which depends, to various degrees, upon the amount of time that elapses between mixing the compositon and exposing the composition to moisture. This characteristic must be taken into consideration when practicing the method of this invention, particularly when it is desired that the method of this invention provides a substrate with a cured organopolysiloxane coating within 60 seconds, and preferably within 30 seconds, at room temperature.

More particularly, when a composition of this invention is prepared with a highly reactive titanium ester, such as tetraisopropyl titanate, it should be applied to a substrate and exposed to moisture within a period of less than 5 minutes after being prepared if a rapid curing of the applied composition at room temperature is desired.

Preferably the composition to be applied in the method of this invention is prepared with partial hydrolyzate, methanolate or ethanolate of tetraisopropyl titanate, delineated above. As noted above such a composition can be held, under anhydrous conditions, for up to 2 hours after being prepared without experiencing a significant increase in cure time.

Of course, if a longer cure time can be tolerated or a higher curing temperature can be used the compositions of this invention can be held for a period of several hours after their preparation, if desired, before being exposed to moisture.

In the process of this invention the compoisition to be applied to a substrate must be maintained under substantially anhydrous conditions until at least shortly before, such as a few seconds before, it is applied to the substrate. Preferably the composition is kept under anhydrous conditions until it is applied, and most preferably until after it has been applied, to a substrate. Thereafter the applied composition can be exposed to moisture when curing thereof is desired.

The compositions of this invention should be applied to a substrate as a thin coating, such as less than 50 mils, preferably less than 5 mils and most preferably less than 0.5 mils, in thickness if a rapid curing thereof is desired Since the curing process appears to involve the diffusion of water into the composition, thick coatings require longer cure times than thin coatings.

Although the liquid composition can be applied to a substrate by any desired method, such as brushing, spreading, flowing, extruding, rolling or spraying, proper consideration must be made of the need for maintaining the above-stated anhydrous conditions until at least shortly before the composition is to be applied. For example, in a spraying method of application comprising the use of a gaseous medium to form and apply an aerosol of the liquid composition, the liquid composition should be maintained under anhydrous conditions at least until the aerosol is formed. As another example, in a brushing, rolling or spreading method of application the liquid composition and those portions of brushes, roller and spreaders that are in contact therewith should be maintained under anhydrous conditions. An example of a method of application to a flexible sheet material which is particularly useful in the method of this invention is disclosed in an application for U.S. patent by Brown et al., entitled "Dual Web Coating Method" and assigned to the assignee of the present invention. Said application, filed on Oct. 18, 1982 and having U.S. Ser. No. 434,813 now abandoned, is incorporate herein by reference to show a method for applying the compositions of this invention.

The substrates to which the compositions of this invention can be applied are not narrowly limited. As to composition they can be cellulosic, such as paper or wood; siliceous, such as concrete, brick, granite, glass, ceramic or mortar; polymeric, such as polyolefin, polyamide, polyester, polycarbonate or polyacrylate; metallic, such as steel, iron, copper, aluminum or silver; and of animal or plant origin, such as leather and wool. As to form, they can be in fiber, filament, sheet, film, woven, flat, convoluted and composite form.

However, due to the rapid curing that takes place when the compositions of this invention are exposed to moisture, substrates which can be rapidly moved past, and be coated by, a stationary source of the coating composition, maintained under anhydrous conditions, and then be exposed to a controlled environment with respect to humidity and temperature are preferred substrates for the process of this invention.

Preferred substrates include flexible sheet material, such as paper; and fiber material, such as optical fibers, which can be rapidly moved through a reservoir of the fresh coating composition, maintained under anhydrous conditions, and then moved into a curing chamber, preferably having a controlled moisture content, such as about 50%; and controlled temperature, such as about 40° C., said moisture content and temperature being more controllable than room conditions.

After the liquid composition has been applied to the substrate it is exposed to a moisture-containing environment, preferably immediately and continuously, until it cures to the extent desired, typically to a non-liquid state that is sufficiently rigid to permit further handling of the coated substrate. For example, in the paper coating art, wherein the paper is typically coated on one side and stored in roll form until being processed further the applied composition need only be cured sufficiently to the dry, solid state to permit rolling of the coated paper; further curing in the roll being permissable without undesirable consequences. In the fiber coating art, wherein the fiber is typically coated completely and stored in spool form until being processed further, the applied composition should be cured sufficiently to prevent adhesion of the spooled fibers due to continued curing of the coating while in intimate contact.

In a preferred embodiment of the method of this invention, wherein a liquid composition of this invention is applied to a flexible sheet material, the viscosity of the liquid composition preferably has a value of from about 300 to 5000 centipoise at 25° C. Such a composition, properly formulated to have a sufficient amount of tetraisopropyl titanate as delineated herein and applied to a paper substrate at a coating weight of approximately 1 pound per ream, reacts with moisture so rapidly that it uses moisture in the paper, as well as in the atmosphere, to form a cured, adherent film at the paper/composition interface before the liquid composition can soak into the paper to any appreciable extent. A beneficial result of this invention is thus the possibility to use less coating composition and/or more porous substrates in the paper coating art than previously required.

The following examples are disclosed to further teach how to practice the present invention in its three aspects but not to limit said invention. All parts and percentages are by weight unless otherwise specified.

Tack-free cure time of a curable composition was measured by applying the composition, ⅛ inch thick, on a polyethylene coated surface and exposing the applied composition to an atmosphere having a relative humidity of 50±4% at 77°±2° F. The time that elapses from exposure to moisture until a 1×8 inch strip of 3 mil polyethylene, applied to the surface of the exposed composition for 4 seconds under a force of 0.5 oz/in.$^2$, can be cleanly removed therefrom was noted as tack-free cure time. For any given composition tack-free cure time is never more than full cure time, described below.

Full cure time of a curable composition was measured by applying the composition to super calendared S2S kraft paper at a coating weight of about 1 pound/ream using a laboratory blade coater and exposing the applied composition to an atmosphere having a relative humidity of 50±4% at 77°±2° F. The time required from exposure to moisture until the applied composition cured to the no smear, no rub-off, no migration state was noted as the full cure time. For any given composition, full cure time is never less than tack-free cure time, described above.

The smear of a coating was measured by lightly rubbing the coating with a finger and looking for hazing of the coating. The degree of haze (none, very slight, slight, moderate, gross) that was observed indicated the degree of smear of the coating. A fully cured coating demonstrates no smear.

The rub-off of a coating was measured by vigorously rubbing the coating with the index finger tip, trying to remove the coating from the paper. The extent of rub-off was described as none, very slight, slight, moderate or gross. A fully cured coating demonstrates no rub-off.

Migration of a coating was measured by placing a test strip of No. 5910 3M ® (St. Paul, Minn.) brand transparent tape on the coating, adhesive-bearing surface in contact with the coating, and rubbing the strip 5 to 20 times with a finger to adhere it to the coating. The strip of transparent tape was then removed from the coating and its adhesive-bearing surface was doubled, end to end, onto itself and pressed firmly together. The force needed to separate the doubled test strip was approximately the same as the force needed to separate a doubled strip of fresh tape for a coating having no migration. Other ratings include very slight, slight, moderate and gross migration. A fully cured coating demonstrates no migration.

Adhesive release for a coating was measured on a fully cured coating that further had been aged for 24 hours at room temperature.

Each cured coating was prepared for release testing according to the following procedure. The cured coating was coated with adhesive using either a solution of Monsanto ® (St. Louis, Miss.) GMS-263 acrylic adhesive (hereinafter Acrylic) or National Starch ® (New York, N.Y.) 36-6045 styrene-butadiene rubber adhesive (hereinafter SBR). The adhesive solution was applied to the cured coating at a wet thickness of 3 mils (76.2 μm) using a draw down bar. The applied adhesive was air-dried at room temperature for one minute, heated at 70° C. for one minute and then cooled to room temperature again for 1 minute. A sheet of 60 pound matte litho was applied to the dried adhesive and the resulting laminate was rolled with a 4.5 pound rubber coated roller and aged at 70° C.

Release testing of the laminates was accomplished by cooling the aged laminates to room temperature, cutting the cooled laminates into 1 inch (25.4 mm) strips and pulling the matte/adhesive laminate from the kraft paper/coating laminate at an angle of 180° ($\pi$ radians) at 400 inches/minute (0.17 m/s). The force, in grams per inch, that was required to separate the laminae was noted as adhesive release. This value was converted to newtons per meter (N/m) for this disclosure by multiplying by 0.3860885 in.N/g.m and rounding off to three significant figures.

EXAMPLE 1

A polydimethyl-co-methylhydrogensiloxane having the average formula HMe$_2$SiO(Me$_2$SiO)$_{142}$(MeHSiO)$_3$-SiMe$_2$H was prepared by heating the following mixture of reactants at 75° C. for 4 hours: (HMe$_2$Si)$_2$O, 1.34 parts; (MeHSiO)$_c$, 1.80 parts (c≧3); (Me$_2$SiO)$_c$, 105.08 parts (c≧3); CF$_3$SO$_3$H, 0.03 parts. The reaction mixture was cooled, neutralized and filtered to provide a fluid siloxane having a viscosity at 25° C. of 259 cs., a specific gravity at 25° C. of 0.968 and a SiH content of 0.044%.

Several organopolysiloxanes of this invention were prepared by mixing, under anhydrous conditons, 500 parts of the above-described polydimethyl-co-methylhydrogensiloxane with a sufficient amount of various vinylalkoxysilanes to react with 110% of the silicon-bonded hydrogen atoms therein and 70 parts per million based on the siloxane, of a platinum-containing catalyst. The mixtures were allowed to stand at room temperature until substantially all of the silicon-bonded hydrogen atoms had reacted with vinyl alkoxysilane. Table I.

The organopolysiloxanes shown in Table I and their associated unreacted vinylalkoxysilane were mixed, in the absence of moisture, with partially hydrolyzed tetraisopropyl titanate, to produce liquid, curable compositions of this invention which contained 90 percent siloxane and 10 percent titanate. The cure time (tack-free and full) were measured as noted above and are listed in Table I. A titanium concentration of 1.87 parts per 100 parts of organopolysiloxane was used in this example.

TABLE I

| Vinylalkoxysilane CH$_2$=CHSiR$_a^1$(OR$^2$)$_3$—O— | | | Organopolysiloxane | Cure Time, seconds | |
|---|---|---|---|---|---|
| a | R$^1$ | R$^2$ | RMe$_2$SiO(Me$_2$SiO)$_{142}$(MeRSiO)$_3$SiMe$_2$R | Tack-free | Full |
| 0 | — | —CH$_3$ | R = —CH$_2$CH$_2$Si(OMe)$_3$ | 5 | 10 |
| 0 | — | —CH$_2$CH$_3$ | R = —CH$_2$CH$_2$Si(OEt)$_3$ | 45 | 135 |
| 0 | — | —CH(CH$_3$)$_2$ | R = —CH$_2$CH$_2$Si(OiPr)$_3$ | 375 | — |
| 0 | — | —C$_6$H$_5$ | R = —CH$_2$CH$_2$Si(OPh)$_3$* | 960 | — |
| 0 | — | —CH$_2$CH$_2$OCH$_3$ | R = —CH$_2$CH$_2$Si(OCH$_2$CH$_2$OCH$_3$)$_3$ | 55 | 270 |
| 1 | —CH$_3$ | —CH$_3$ | R = —CH$_2$CH$_2$SiMe(OMe)$_2$ | 15 | 45 |
| 1 | —CH$_3$ | —CH$_2$CH$_3$ | R = —CH$_2$CH$_2$SiMe(OEt)$_2$ | 225 | — |

*Not of this invention

EXAMPLE 2

A 10% excess of an organotrimethoxy silane having the formula CH$_2$=C(CH$_3$)CO$_2$(CH$_2$)$_3$Si(OMe)$_3$ was reacted with the polydimethyl-co-methylhydrogensiloxane described in Example 1 to prepare an organopolysiloxane of this invention having the formula RMe$_2$SiO(Me$_2$SiO)$_{142}$(MeRSiO)$_3$SiMe$_2$R wherein R denotes —CH$_2$CH(CH$_3$)CO$_2$(CH$_2$)$_3$Si(OMe)$_3$. The organopolysiloxane was mixed under anhydrous conditions, with partially hydrolyzed tetraisopropyl titanate to produce a curable composition of this invention which contained 90 percent organopolysiloxane and associated unreacted organotrimethoxysilane and 10 percent titanate. Paper was coated with this curable composition according to the method of this invention and a full cure time of 45 seconds was noted therefor.

EXAMPLE 3

An organopolysiloxane having the structure ViMe$_2$SiO(Me$_2$SiO)$_{142}$(MeViSiO)$_3$SiMe$_2$Vi, 200 parts, was mixed at room temperature with 17.2 parts of HSCH$_2$CH$_2$CH$_2$Si(OMe)$_3$ and 0.2 parts of a mineral oil solution of ferric octoate (6% Fe). The mixture was stirred for one hour then pressure filtered to give an organopolysiloxane bearing —CH$_2$CH$_2$SCH$_2$CH$_2$CH$_2$Si(OMe)$_3$ radicals. One hundred parts of this organopolysiloxane was mixed with 6.4 parts of a partial hydrolyzate of tetraisopropyl titanate (1.1 parts of titanium) and the resulting composition of this invention was found to have a full cure time of 60 seconds at 23° C. When this experiment was repeated with 8.7, 11.1 and 13.6 parts of the titanate (1.5, 1.87 and 2.29 parts of titanium) full cure times of 27, 20 and 17 seconds were measured. The four cured coatings released acrylic adhesive (GMS-263) with a force of 45 to 55 g/in. (17.4 to 21.2 N/m) and rubber adhesive (SBR-6045) with a force of 21 to 26 g/in. (8.1 to 10.0 N/m).

EXAMPLE 4

This example illustrates the need for high levels of titanium ester to get rapid cure when the organopolysiloxane contains only 2 alkoxysilylorganic radicals. An organopolysiloxane having the formula RMe$_2$SiO(Me$_2$SiO)$_{250}$SiMe$_2$R where R denotes —CH$_2$CH$_2$Si(OMe)$_3$ was prepared by a hydrosilylation reaction of CH$_2$=CHSi(OMe)$_3$ with HMeSiO(Me$_2$SiO)$_{250}$SiMe$_2$H as described in Example 1. One hundred parts of the organopolysiloxane were mixed with 17 parts of mixture of 80% TPT (tetraisopropyl titanate) and 20% dry methanol. The resulting composition of this invention had 2.3 parts of titanium in the form of partially methanolized TPT and a full cure time of 30 seconds. The resulting cured coating release acrylic adhesive (GMS-263) with a force of 18.1 N/m after no aging and 88.4 N/m after aging at 70° C. for 2 weeks. When the experiment was repeated with 5.2 parts of the mixture of partially methanolized titanium ester (0.88 parts of titanium) instead of 17 parts a full cure time of 1500 seconds was measured.

EXAMPLE 5

Two linear organopolysiloxanes having an average of 100 dimethyl siloxane units and two —CH$_2$CH$_2$Si(OMe)$_3$ radicals were prepared, one having the —CH$_2$CH$_2$Si(OMe)$_3$ radicals on the ends of the polydimethylsiloxane chain and the other having the —CH$_2$CH$_2$Si(OMe)$_3$ radicals randomly spaced along the polydimethylsiloxane chain (in place of methyl radicals) which was therefore endblocked with trimethylsiloxane units. When mixed with approximately 8.7 parts/100 parts organopolysiloxane of the partially methanolized titanium ester of Example 4 (1.5 parts of titanium), the resulting compositions had a full cure time of 210 seconds and 1088 seconds respectively. This example illustrates the effect of terminal alkoxysilylorganic groups for providing a more rapid cure rate. Compare also Example 6.

EXAMPLE 6

Two linear organopolysiloxanes having an average of 100 dimethylsiloxane units and 7 —$CH_2CH_2Si(OMe)_3$ radicals were prepared, one having a —$CH_2CH_2Si(OMe)_3$ radicals on both ends of the polydimethylsiloxane chain and the other having methyl radicals on the ends of the polydimethylsiloxane chain, the remaining —$CH_2CH_2Si(OMe)_3$ radicals in each case being randomly spaced along the polydimethylsiloxane chain in place of methyl radicals. When mixed with approximately 8.7 parts/100 parts of organopolysiloxane of the partially methanolized titanium ester of Example 4 (10.9 parts of the mixture of TPT and MeOH and 1.5 parts of titanium) the resulting compositions had a full cure time of 30 and 90 seconds, respectively. This example illustrate the effect of terminal alkoxysilylorganic groups for providing a more rapid cure rate. Compare also Example 5.

EXAMPLE 7

Two organopolysiloxanes of this invention having the formula $RMe_2SiO(Me_2SiO)_x(MeRSiO)_ySiMe_2R$ were prepared wherein R denotes —$CH_2CH_2Si(OMe)_3$; one with $x=390$; $y=10$ and the other with $x=238$; $y=12$. Four liquid compositions of this invention were prepared by mixing either 5.2 parts or 17 parts of the 80%/20% mixture of TPT/MeOH that is described in Example 4 to provide either 4.2 parts or 13.6 parts of partially methanolized titanium ester and either 0.7 or 2.3 parts of titanium for every 100 parts of organopolysiloxane.

The four curable compositions were applied to paper and became fully cured within 120 seconds when exposed to moisture.

EXAMPLE 8

A rapidly curing composition of this invention was prepared by mixing, under anhydrous condition, 100 parts of an organopolysiloxane having the formula $Me_3SiO(Me_2SiO)_{242}(MeRSiO)_6SiMe_3$ wherein R denotes —$CH_2CH_2Si(OMe)_3$ and 17 parts of the mixture of TPT and MeOH in Example 4. The resulting mixture had about 13.6 parts of partially methanolized titanium ester and 2.3 parts of titanium for every 100 parts of organopolysiloxane.

The resulting curable composition was applied to paper and exposed to moisture. A full cure was obtained in 20 seconds. The resulting cured coating released acrylic adhesive with a force of 58 g/in. (22.4 N/m) after no aging and 95 g/in. (36.7 N/m) after 2 weeks at 70° C. Corresponding values for SBR adhesive were 55 g/in. (21.2 N/m) in each case.

EXAMPLE 9

When 100 parts of an organopolysiloxane having the formula $RMe_2SiO(Me_2SiO)_{242}(MeRSiO)_6SiMe_2R$, where R denotes —$CH_2CH_2Si(OMe)_3$, were mixed under substantially anhydrous conditions with from 1 to 10 parts of either TPT (0.17 to 1.7 parts of titanium) or di-(isopropoxy)-di-(ethylacetoacetoxy) titanium (TDIDE) (0.12 to 1.2 parts of titanium) compositions having a tack-free cure time of less than 120 seconds were obtained.

EXAMPLE 10

Five compositions were prepared by mixing, under substantially anhydrous conditions, 100 parts of an organopolysiloxane having the formula $Me_3SiO(Me_2SiO)_x(MeRSiO)_ySiMe_3$ wherein R denotes —$CH_2CH_2Si(OMe)_3$, x had a value of about 213 and y had a value of about 12; and either 11.1, 8.7, 6.4, 4.2 or 2.0 parts of the titanate/methanol mixture disclosed in Example 4 (1.5, 1.2, 0.86, 0.57 and 0.27 parts of titanium). Only the compositions containing 1.5, 1.2 and 0.86 parts of titanium had a full cure time of 30 seconds or less at 25° C. Heating these applied coatings to 60° C. reduced their full cure time to 5 seconds or less. The composition containing 0.57 parts of titanium had to be heated to 80° C. to have a full cure time or 20 seconds. The composition containing 0.27 parts of titanium would not fully cure in less than 30 seconds, even when heated to 120° C.

EXAMPLE 11

The composition of Example 10 having 1.5 parts of titanium was applied to various substrates using a blade coater at a blade pressure of 20 p.s.i. After 5 seconds of exposure to moisture at room temperature each applied coating was examined for cure. In each case the coating was cured with respect to the smear test and to the migration test, and also with respect to the rub-off test when the substrate was corona-treated polyester, corona-treated polypropylene, kraft paper or corona-treated polyethylene. However, the coating did not pass the rub-off test when the substrate was untreated polyethylele, untreated polypropy lene or polyester film.

EXAMPLE 12

This example illustrates the effect of the age of a composition of this invention on its cure rate.

The composition that was used in Example 11 was prepared and coated onto kraft paper immediately, after 30 minutes and after 60 minutes and the applied composition was immediately exposed to moisture in each case. The time required for the coated composition to reach a full cure was noted to be 5 seconds, 5 seconds and 10 seconds, respectively.

When the above composition was prepared using 11.1 parts of fresh tetraisopropyl titanate and the resulting composition was coated onto kraft paper immediately, after 5 minutes and after 10 minutes and exposed to moisture immediately thereafter, full cure times of 5 seconds, 20 seconds and 60 seconds, respectively were noted.

EXAMPLE 13

The organopolysiloxane used in the experiment of Example 10 was mixed with 11.11 or 5.26 or 2.56 parts of $OV(OC_3H_7)_3$ per 100 parts of the organopolysiloxane (2.3, 1.1 or 0.5 parts of vanadium, respectively). All three compositions had a full cure time of 30 seconds or less at 25° C.

EXAMPLE 14

Example 13 was repeated except that 9.00 parts of tetrapropyl zirconate or 11.11 parts of tetrapropyl titanate or 6.78 parts of triisopropoxy vanadium oxde was used instead of the stated amounts $OV(OC_3H_7)_3$. Tack free times of 18 seconds, 12 seconds and 35 seconds respectively were noted.

That which is claimed is:

1. An organopolysiloxane fluid, stable in the absence of moisture and having the formula

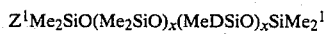

wherein
Me denotes a methyl radical,
D denotes $-Q^1SiMe_a(OMe)_{3-a}$,
a has a value of 0 or 1,
x has an average value of at least about 50,
x+y has a value of from about 100 to about 400,
y has an average value of from 1 to about (x+y)/4,
and a value of from 1 to about 3600/(x+y) when the value of x+y is 120 or more
and the organopolysiloxane fluid contains an average of at least 3 D radicals per molecule and wherein each $Z_1$ denotes a D radical and $Q_1$ denotes an alkylene radical having from 2 to about 10 carbon atoms.

2. An organopolysiloxane fluid, stable in the absence of moisture, which has the formula $Z^1R_2SiO(Me_2SiO)_x(DR^1SiO)_y(R_2^1SiO)_zSiR_2^1Z^1$ Me denotes a methyl radical,
D denotes an alkoxysilorganic radical having the formula $-Q^1SiR_a^1(OR^2)_{3-a}$,
$R^1$ denotes a monovalent hydrocarbon or substituted hydrocarbon radical having from 1 to 6 carbon atoms,
$R^2$ denotes a methyl, ethyl, propyl or methoxyethyl radical,
$Q^1$ denotes a divalent organic radical free of sulfur atoms,
$Z^1$ denotes a D radical or an $R^1$ radical,
a has a value of 0 or 1,
x has an average value of at least about 50,
y has an average value of from 1 to about (x+y+z)/4,
z has an average value not exceeding the value of x and the organopolysiloxane fluid contains an average of at least 3 D radicals per molecule wherein a minor portion of $R^1$ radicals are substituted with a radical selected from halogen, cyano, amido and carbalkoxy.

3. A liquid composition which cures to a non-liquid composition when exposed to moisture, said liquid composition being prepared by mixing, under substantially anhydrous conditions, components comprising
(A) an organopolysiloxane fluid having the formula $Z^1R_2^1SiO(Me_2SiO)_x(DR^1SiO)_y(R_2^1SiO)_zSiR_2^1Z^1$ wherein
Me denotes a methyl radical,
D denotes an alkoxysilylorganic radical having the formula $-Q^1SiR_a^1(OR^2)_{3-a}$,
$R^1$ denotes a monovalent hydrocarbon or substituted hydrocarbon radical having from 1 to 6 carbon atoms,
$R^2$ denotes a methyl, ethyl, propyl or methoxyethyl radical,
$Q^1$ denotes a divalent organic radical free of sulfur atoms,
$Z^1$ denotes a D radical or an $R^1$ radical,
a has a value of 0 or 1,
x has an average value of at least about 50,
y has an average value of from 1 to about (x+y+z)/4,
z has an average value not exceeding the value of x and the organopolysiloxane fluid contains an average of at least 3 D radicals per molecule, and
(B) a metal ester, soluble in said liquid composition, selected from the group consisting of titanium esters, zirconium esters, hafnium esters and vanadium oxide esters; the amounts of components (A) and (B) being sufficient to provide a tack-free curve time of less than 120 seconds for the liquid composition.

4. A liquid composition according to claim 3 wherein the metal ester is a titanium ester mixed in sufficient amount to provide from 0.5 to 4.0 parts by weight of titanium for every 100 parts by weight of organopolysiloxane fluid.

5. A liquid composition according to claim 4 wherein the titanium ester is tetraisopropyl titanate or a partial hydrolyzate, methanolate or ethanolate thereof.

6. A liquid composition according to claim 5 wherein the organopolysiloxane fluid has the formula $Z^1Me_2SiO(Me_2SiO)_x(MeDSiO)_ySiMe_2Z^1$ wherein the sum of x+y has a alue of from about 100 to about 400, y has a value of from 1 to about 3600/(x+y) when the value of x+y is 120 or more, D denotes $-Q^1SiMe_a(OMe)_{3-a}$ and the amount of titanium ester is sufficient to provide from about 1.5 to about 2.5 parts by weight of titanium for every 100 parts by weight of organopolysiloxane fluid.

7. A liquid composition according to claim 6 wherein the organopolysiloxane fluid has the formula $$Me_3SiO(Me_2SiO)_x(MeSiO)_ySiMe_3$$
$$|$$
$$C_nH_{2n}Si(OMe)_3$$

wherein y has a value of at least 3 and n has a value of from 2 to about 10.

8. A liquid composition according to claim 6 wherein the organopolysiloxane fluid has the formula $$(MeO)_3SiC_nH_{2n}(Me)_2SiO(Me_2SiO)_x(MeSiO)_ySi(Me)_2C_nH_{2n}Si(OMe)_3,$$
$$|$$
$$C_nH_{2n}Si(OMe)_3$$

wherein y has a value of at least 1 and n has a value of from 2 to about 10.

9. A liquid composition according to claim 3 wherein a minor portion of the $R^1$ radicals are substituted with a radical selected from halogen, cyano, amido and carbalkoxy.

10. A method comprising
(i) applying to a substrate a liquid composition which cures to a non-liquid composition when exposed to moisture, said liquid composition being prepared by mixing, under substantially anhydrous conditions, components comprising
(A) an organopolysiloxane fluid having the formula $Z^1R_2^1SiO(Me_2SiO)_x(DR^1SiO)_y(R_2^1SiO)_zSiR_2hu 1Z^1$ wherein
Me denotes a methyl radical,
D denotes an alkoxysilylorganic radical having the formula $-Q^1SiR_a^1(OR^2)_{3-a}$,
$R^1$ denotes a monovalent hydrocarbon or substituted hydrocarbon radical having from 1 to 6 carbon atoms,
$R^2$ denotes a methyl, ethyl, propyl or methoxyethyl radical, $Q^1$ denotes a divalent organic radical free of sulfur atoms, $Z^1$ denotes a D radical or an $R^1$ radical, a has a value of 0 or 1, x has an averge value of at least about 50, y has an average value of from 1 to about $(x+y+z)/4$, z has an average value not exceeding the value of x and the organo-polysiloxane fluid contains an average of at least 3 D radicals per molecule, and (B) a metal ester, soluble in said liquid composition, selected from the group consisting of titanium esters, zirconium esters, hafnium esters and vanadium oxide esters; the amounts of components (A) and (B) being sufficient to provide a tack-free cure time of less than 120 seconds for the liquid composition and (ii) exposing the applied liquid composition to a moisture-containing environment until the applied composition has attained at least the desired amount of cure.

11. A method according to claim 10 wherein the metal ester is a titanium ester mixed in sufficcient amount to provide from 0.5 to 4.0 parts by weight of titanium for every 100 parts by weight of the organopolysiloxane fluid.

12. A method according to claim 11, wherein the titanium ester is tetraisopropyl titanate or a partial hydrolyszate, methanolate or ethanolate thereof.

13. A method according to claiim 12 wherein the liquid composition has a viscosity at 25° C. of from about 300 to 5000 centipoise and the substrate is a flexible sheet material.

14. A method according to claim 13 wherein the flexible sheet material is paper.

15. A method according to claim 13 wherein the organopolysiloxane fluid has the formula $Z^1Me_2SiO(Me_2SiO)_x(MeDSiO)_ySiMe_2Si(OME)_3$
and wherein $x+y$ has a value of from about 100 to about 400, y has a value of from about 3 to about $3600/(x+y)$ when the value of $x+y$ is 120 or more, D denotes $-CH_2CH_2Si(OMe)_3$ and the amount of titanium ester is sufficient to provide from about 1.5 to about 2.5 parts by weight of titanium for every 100 parts by weight of organopolysiloxane fluid.

16. A method according to claim 15 wherein the titanium ester is tetraisopropyl titanate and said exposing is done within a period of 5 minutes after said mixing.

17. A method according to claim 15 wherein the titanium ester is a partial hydrolyzate, methanolate or ethanolate of tetraisopropyl titanate and said exposing is done within a period of 2 hours after said mixing.

18. A method according to claim 10 wherein the substrate is a length of optical fiber.

19. A method according to claim 10 wherein a minor portion of $R^1$ radicals are substituted with a radical selected from halogen, cyano, amido and carbalkoxy.

20. A coated substrate prepared by the method of claim 10.

21. A coated substrate prepared by the method of claim 13.

22. A coated substrate prepared by the method of claim 15.

* * * * *